United States Patent
Bosmans et al.

(10) Patent No.: US 7,946,011 B2
(45) Date of Patent: May 24, 2011

(54) DEVICE AND A METHOD FOR FITTING AN ELASTIC ELEMENT AROUND A PARTICULARLY RECTILINEAR ELEMENT

(75) Inventors: Jan Bosmans, Melsele (BE); Frank Bosmans, Eke (BE)

(73) Assignee: Ghent-Supply, Eke-Nazareth (BE)

( * ) Notice: Subject to any disclaimer, the term of this patent is extended or adjusted under 35 U.S.C. 154(b) by 979 days.

(21) Appl. No.: 11/814,126

(22) PCT Filed: Jan. 4, 2006

(86) PCT No.: PCT/EP2006/000027
§ 371 (c)(1),
(2), (4) Date: Jul. 17, 2007

(87) PCT Pub. No.: WO2007/071292
PCT Pub. Date: Jun. 28, 2007

(65) Prior Publication Data
US 2008/0127787 A1    Jun. 5, 2008

(30) Foreign Application Priority Data

Jan. 18, 2005 (FR) ...................................... 05 00510

(51) Int. Cl.
*B23P 11/00* (2006.01)
(52) U.S. Cl. ...................... 29/243.55; 29/243.56; 81/485
(58) Field of Classification Search ................. 29/243.5, 29/243.56, 244, 255, 257, 259, 266, 278; 81/485, 9.3, 314, 487, 486, 3.7
See application file for complete search history.

(56) References Cited

U.S. PATENT DOCUMENTS

| 289,600 | A | * | 12/1883 | Barbour | 81/9.3 |
|---|---|---|---|---|---|
| 927,691 | A | * | 7/1909 | Smith | 81/9.3 |
| 2,160,652 | A | * | 5/1939 | Feigh | 29/222 |
| 2,600,394 | A | * | 6/1952 | Conklin | 81/9.3 |
| 2,859,648 | A | * | 11/1958 | McCarley | 81/487 |
| 4,553,422 | A | * | 11/1985 | Bilkie | 72/458 |
| 5,170,682 | A | * | 12/1992 | Sorensen et al. | 81/487 |
| 5,778,946 | A | * | 7/1998 | Pellenc et al. | 140/119 |
| 5,893,456 | A | | 4/1999 | Bosmans | |
| 6,378,175 | B1 | * | 4/2002 | Vanderpan | 24/336 |
| 6,601,278 | B2 | * | 8/2003 | Koppe | 29/259 |
| 7,093,518 | B2 | * | 8/2006 | Gmeilbauer | 81/9.3 |

FOREIGN PATENT DOCUMENTS
FR         2613811       10/1988
* cited by examiner

*Primary Examiner* — George Nguyen
(74) *Attorney, Agent, or Firm* — Ladas & Parry LLP

(57) ABSTRACT

A device and a method for the automatic fitting of an elastic element, which includes a closed loop around a rectilinear element in particular, such as an assembly including a vine shoot and a support wire. The device includes an upper arm, equipped at one of its ends with a hook for hooking an upper portion of the closed loop of the elastic element, with the upper arm being mounted by its other end to pivot around an axis. The device also includes two lower arms, equipped at one of their ends with a hook for hooking a lower portion of the closed loop of the elastic element, with the lower arms being mounted by their other end to pivot around the same axis. The device also rotates around the axis of the upper arm in a given direction and of the lower arms in the reverse direction.

14 Claims, 4 Drawing Sheets

Figure 1A:
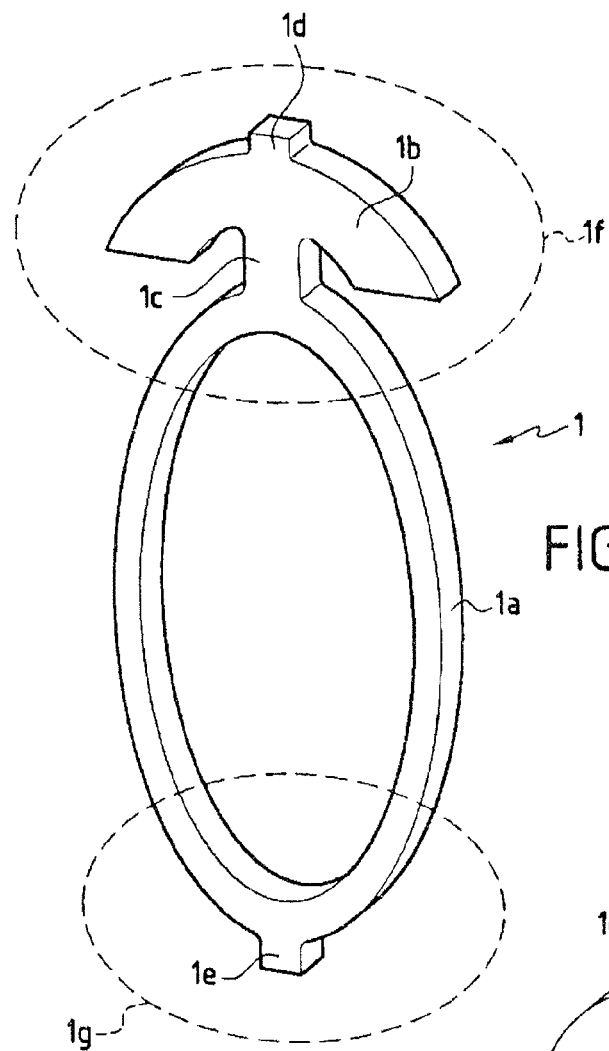

DEVICE AND A METHOD FOR FITTING AN ELASTIC ELEMENT AROUND A PARTICULARLY RECTILINEAR ELEMENT

BACKGROUND OF THE INVENTION

The subject of this present invention is a device and a fitting method, in particular for the automatic fitting of an elastic element around an element, in particular, a rectilinear element, such as around an assembly composed of a vine shoot and a support wire for example. The invention therefore finds a particular application in the securing of branches such as vine shoots to a support such as a support wire.

Generally speaking, in both the horticulture and wine-growing domains, one seeks to guide the growth of a plant along a support, such as a cordon a trainer, a rope, a support wire or other. This support, along which the plant is fixed, can be rectilinear or curvilinear, horizontal or vertical, and is thus used to assist the growth of the plant. It is therefore necessary to keep the plant attached to this support at one or more places.

Most of the known securing methods and systems consist of a binding or clamping of the plant onto its support. This type of securing method and system is always accompanied by a risk of damage to the plant, or indeed of insufficiently effective clamping.

We are also familiar with elastic elements having the advantage of reducing the risks of damaging the plant while still providing effective securing onto the support. It is possible in particular to use elastic securing elements including a closed loop, a head, and a neck connecting this head to the closed loop, in which the head is extended by a top stub. Ideally, the closed loop is also extended by a bottom stub, thus facilitating the fitting of the elastic element by hand. In fact, the stage that consists of inserting the prominent head into the closed loop is facilitated by the fact that the user is able to grasp this bottom stub, instead of directly grasping the closed loop in order to stretch the elastic element. As a consequence, the hand of the user does not impede the passage of the head into the closed loop.

The bottom stub can be diametrically opposite to the top stub. These elastic elements can be made of rubber.

In order to facilitate the transportation and the fitting of these elastic elements in large quantities and over large areas, they can be designed to form part of a prepared bundle, which includes at least two of these elastic securing elements. These elastic elements are connected together by a first link at the level of their respective top stubs, with their respective closed loops, heads and necks not connected together. Ideally, these elastic elements are also connected together by a second link at the level of their respective bottom stubs. Thus, with the elastic elements also connected together at the level of the bottom stub extending the closed loop, the latter no longer tends to float since it is not left free, to the extent that the hooking of this lower part of the closed loop to a fitting device, is rendered more efficient, since the maintenance of this device in the closed loop is more reliable. Moreover, the tearing off or detachment of an elastic element, in order to install it, takes place with no risk of damage to the closed loop.

One of the first and second links can be a partial link, achieved for example by pre-cutting, so as to facilitate still further the later separation of the elastic elements by tearing at this partial link.

The fitting of these elastic elements is finicky and often painful work. The fitting conditions, outdoors, in areas under cultivation and in large quantities, especially in the case of wine-growing, are such that a considerable time is required to fit this type of elastic element.

If they are sufficiently strong and durable, these elastic elements are also difficult to fit by hand because of the significant force needed to stretch them during the fitting process, which renders this repeated action of fitting them a painful one.

Moreover, during the growth of the plant, it is sometimes necessary to either move the elastic element or to add a new one, which calls for regular repetition of this process for the fitting of these elastic elements.

There is therefore a need for a device and a method for fitting an elastic element, around a rectilinear element in particular, such as around an assembly composed of a vine shoot and a support wire for example, which allows the aforementioned drawbacks to be circumvented. In particular, there is a requirement for a device and a method allowing rapid, simple and automatic fitting of a large number of elastic elements.

SUMMARY OF THE INVENTION

Thus the purpose of this present invention is to overcome the aforementioned drawbacks by proposing a device and a method allowing the elastic element to be stretched around the rectilinear element in particular, without effort, rapidly and easily, and that then allows the latter to be encircled up to closure by relaxing the stretch on the elastic element.

According to a first aspect, the invention therefore relates to a device for fitting an elastic element, including one part in a closed loop around a rectilinear element in particular. The device is characteristic in that it includes at least one upper arm, equipped at one of its ends with a means for hooking an upper portion of the closed loop of the elastic element, with the upper arm being mounted by its other end to pivot around an axis. In a characteristic manner, the device also includes at least two lower arms, each equipped at one of its ends with a means for hooking a lower portion of the closed loop of the elastic element, with the lower arms being mounted, each by its other end, to pivot around the same axis. In addition, the device includes rotation means around the axis of the upper arm in a first direction of rotation, and of the lower arms in the direction of rotation of the first direction of rotation, from a first loading position up to a second fitting position of the elastic element.

Thus, in a first part of the rotation, firstly the end of the upper arm, and secondly the ends of the lower arms, move away from each other. And then, in a second part of the rotation, these ends approach each other until the end of the upper arm passes between the ends of the lower arms.

In an implementation variant, the rotation means include a longitudinal rod which is movable in translation between a first rear loading position of the elastic element and a second front fitting position of the elastic element, around the rectilinear element in particular, as well as means for movement in translation of the longitudinal rod and means for converting the translation movement of the longitudinal rod into rotation of the upper and lower arms around the axis of rotation.

Preferably, the means for converting the translation movement of the longitudinal rod into rotation of the upper and lower arms around the axis of rotation, include at least one toothed circular element fixed to the front end of the longitudinal rod, which is free to rotate around the axis of rotation of the upper and lower arms and that creates the link between these arms and the longitudinal rod, and at least one rack element whose teeth mate with the teeth of the toothed circular element.

Thus, a translation movement of the longitudinal rod generates the rotation of the toothed circular element around the axis of rotation of the upper and lower arms. In its turn, this rotation generates the rotation, around this same axis, of the upper arm in one direction of rotation, and of the lower arms in the direction of rotation opposite to this first direction of rotation.

Preferably, the means for movement in translation of the longitudinal rod include a trigger and/or an actuator.

In another implementation variant, possibly in combination with the preceding one, the device includes means for the automatic return of the upper and lower arms to the first loading position of the elastic element.

Preferably, these means for the automatic return of the upper and lower arms to the first loading position of the elastic element, include at least one spring.

Again preferably, this spring should oppose the translation of the longitudinal rod from the first loading position to the second fitting position of the elastic element.

In another implementation variant, possibly in combination with either of the preceding ones, the upper and lower arms are curved.

Where appropriate, the lower arms are identical and parallel.

Preferably, the distance between the end of the upper arm and the axis of rotation is less than the distance between the respective ends of the lower arms and this axis.

Preferably also, at least one of the means for hooking a portion of the closed loop of the elastic element, is a lug forming a "V" or a "U" with the end of the lower or upper arm on which it is located.

Also preferably, the device includes a magazine for automatic loading of the elastic element.

According to a second aspect, the invention also relates to a method for fitting an elastic element, including a closed loop, around a rectilinear element in particular, implemented by the device according to the first aspect of the invention.

In an implementation variant, the method of the invention includes a stage for stretching the elastic element between an upper portion and a lower portion of its closed loop, a stage for encircling the rectilinear element in particular with the elastic element, and a stage for closing the encircling of the rectilinear element in particular by the elastic element, by inserting the upper portion of the closed loop of the elastic element into this closed loop at the level of its lower portion.

Thus, the device and the method of the invention advantageously allow rapid, efficient and repeated fitting of an elastic element around an assembly of the vine shoot and metal support type for example.

BRIEF DESCRIPTION OF THE DRAWING FIGURES

Figure 1B:
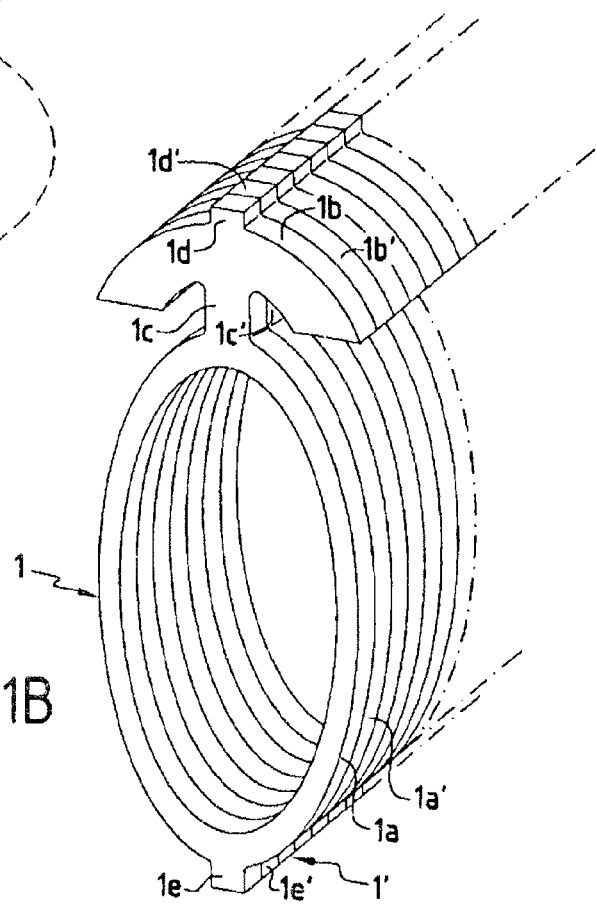

Other characteristics and advantages of the invention will appear more clearly and more fully on reading the description that follows of the preferred implementation variants of the device and implementation of the method, which are provided by way of non-limiting examples and with reference to the following appended drawings:

FIG. 1a schematically represents an elastic element to be fitted with the fitting device of the invention, FIG. 1b schematically represents a prepared bundle of elastic elements to be fitted with the fitting device of the invention, FIGS. 2 to 6 schematically represent the device for the fitting of an elastic element according to the invention, at different stages of the fitting process.

DETAILED DESCRIPTION OF THE PREFERRED EMBODIMENTS

FIG. 1a schematically represents an example of an elastic element used by the device and in the method of the invention.

The elastic element 1 includes a closed loop 1a, a head 1b, and a neck 1c connecting the head 1b to the closed loop 1a. The head 1b is extended by a top stub 1d.

The closed loop 1a is extended by a bottom stub 1e. The latter is preferably diametrically opposite to the top stub 1d.

FIG. 1a also shows the upper part or portion of the closed loop 1a with the reference 1f, and the lower part or portion of the closed loop 1a with the reference 1g, in order to explain the operation of the device and the method for fitting the invention, a little later with reference in FIGS. 2 to 6.

The elastic element 1 is naturally made of a material with elastic properties such as rubber for example. This elastic element 1 therefore allows the securing in particular of a vine shoot onto a support wire, by encircling it with the elastic element 1 stretched around the shoot and the support wire. The circle is then closed by forcing the head 1b to pass, by deformation, into the closed loop 1a. After releasing the elastic element 1 into an unstretched state, the head 1b, which is prominent and acts as an anchor, prevents the tie from opening since the prominent lateral parts of this head 1b are trapped in the closed loop 1a.

The manual fitting of such an elastic securing element 1 is advantageously aided by virtue of the presence of the bottom stub 1e. In fact, it allows the user to stretch the elastic element 1 without having to pull directly on the closed loop 1a. With the user having grasped the elastic element 1 firstly by the top stub 1d and secondly by the bottom stub 1e, he is then more easily able to stretch the elastic element 1 and encircle the vine shoot and the support wire. Then, since he has not grasped the closed loop 1a directly and he is therefore not impeding the passage into the latter, he is more easily able to insert the head 1b by deformation into this closed loop 1a.

FIG. 1b schematically represents a prepared bundle of elastic elements such as that represented in FIG. 1a.

This prepared bundle includes at least two elastic securing elements 1, 1' according to the elastic securing element 1 in FIG. 1a.

The elastic elements 1, 1' are connected together by a first link at the level of their respective top stubs 1d, 1d'. On the other hand, their closed loops 1a, 1a' their heads 1b, 1b', as well as their respective necks 1c, 1c' are not connected together and are therefore detached from each other.

The elastic elements 1, 1' are connected together by a second link at the level of their respective bottom stubs 1e and 1e'.

Preferably, at least one of these two links is a partial link, so as to facilitate the separation of the elastic elements 1, 1'. This partial link can be achieved by pre-cutting, represented in FIG. 1b by broken lines between the top stubs 1d, 1d' and the bottom stubs 1e, 1e'. For example, this can be a full lateral cut but over only part of the length of the stubs. It can also be a full longitudinal cut in the stubs but incomplete laterally.

Naturally, it is preferable that the prepared bundle of the invention should include a number of elastic securing elements 1, 1' greater than two, which are then linked two-by-two as explained above.

This prepared bundle can be achieved for example by the extrusion of an elastic material like rubber. The elastic elements 1, 1' are then created by a partial lateral cutting-out process that leaves the top and bottom connected two-by-two as explained above.

Thus, the prepared bundle of the invention advantageously allows the use of the fitting device of the invention as described later with reference in FIGS. 2 to 6. The presence of the respective bottom stubs in fact advantageously allows the bottom linking of the elastic elements making up the prepared bundle, which is necessary in order to facilitate loading onto the fitting device, with no risk of damage to the lower part of the closed loops at the moment of separation or detachment of the elastic elements.

FIGS. 2 to 6 schematically represent the device for fitting an elastic element according to the invention, at different stages of the fitting process.

Figure 2:
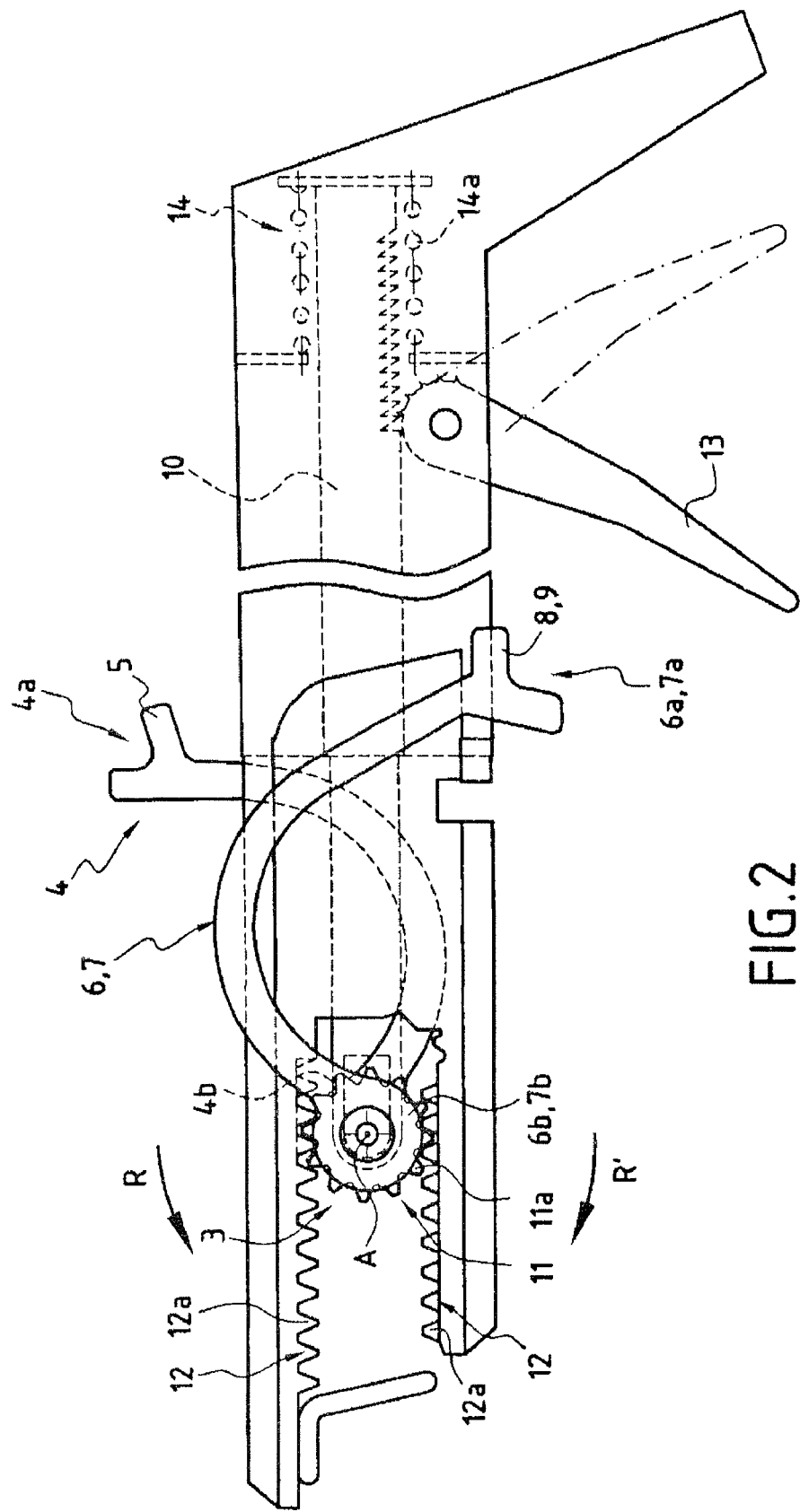

FIG. 2 schematically represents the fitting device at rest, with no elastic element loaded.

The fitting device includes an upper arm 4, possibly curved, and two lower arms 8, 9, possibly curved, which are parallel and identical, and which are therefore coincident in FIG. 2.

At the end 4a of the upper arm 4, there is a lug 5 that forms a "U" or a "V" with this end 4a, and that is intended to hook onto an upper portion of the closed loop of an elastic element. At the respective ends 6a, 7a of the lower arms 6, 7, are respectively located lugs 8 and 9, which therefore each forms a "U" or a "V" with these respective ends 6a, 7a, and that are intended to hook onto a lower portion of the closed loop of an elastic element. These upper 4 and lower 6, 7 arms are mounted by their other respective ends 4b, 6b, 7b to pivot around axis A. The rotation of these upper 4 and lower 6, 7 arms around axis A is achieved by means of rotation means 3.

These rotation means 3 include, for example, a longitudinal rod 10 that is movable in translation between a first rear loading position of an elastic element and a second front fitting position of this elastic element, in particular around a vine shoot and a support wire. The translation movement of this longitudinal rod 10 is transmitted and converted into the rotation of the upper 4 and lower 6, 7 arms around axis A.

The conversion of this translation movement of the longitudinal rod 10 into the rotation of the upper 4 and lower 6, 7 arms around axis A, is achieved for example by means of a toothed circular element such as a toothed wheel 11 whose teeth 1, 1a mate with the teeth 12a of an element of the rack type 12. The toothed wheel 11, fixed to the front end of the longitudinal rod 10, is free to rotate around axis A, and creates the link between firstly the upper 4 and lower 6, 7 arms and secondly the longitudinal rod 10.

The translation movement of the longitudinal rod 10 is triggered by means 13 for movement in translation such as a manually-operated trigger or indeed an automatic actuator.

It is possible to provide for the inclusion of means 14 for automatic return of the upper 4 and lower 6, 7 arms to the initial position for the loading of an elastic element. These means include, for example, a spring 14a that should oppose the translation of the longitudinal rod 10 from the first loading position to the second position for fitting an elastic element.

A trigger 13 is thus represented in FIG. 2. A movement of this trigger 13 to the rear, by applying sufficient pressure to the spring 14a, causes the movement of the longitudinal rod 10 forwards in translation. A movement of this trigger 13 toward the rear, after releasing the pressure on the spring 14a, therefore causes the movement of the longitudinal rod 10 toward the rear in translation.

Thus, the rotation means 3 described above 2, 5 allow the rotation, around axis A, of the upper arm 4 in one direction R, and of the lower arms 6, 7 in direction R', opposite to direction R.

As will be seen in greater detail with reference to FIGS. 3 to 6, in a first part of the rotation, firstly the end 4a of the upper arm 4, and secondly the respective ends 6a, 7a of the lower arms 6, 7, move away from each other. And then, in a second part of the rotation, these ends approach each other, until the end 4a of the upper arm 4 passes between the respective ends 6a, 7a of the lower arms 6, 7.

Figure 5:
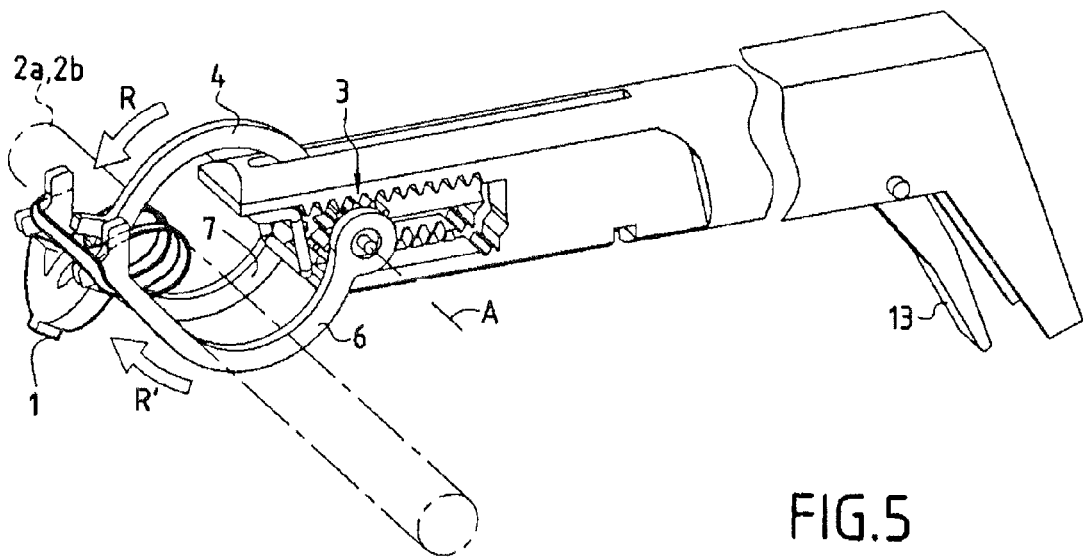

As will also be seen, with reference in particular to FIG. 5, the distance between the end 4a of the upper arm 4 and axis A is preferably less than the distance between the respective ends 6a, 7a of the lower arms 6, 7 and axis A, in order to more easily allow the passage of the head of the elastic element held by the upper arm 4 into the closed loop of the elastic element held by the lower arms 6, 7.

Figure 3:
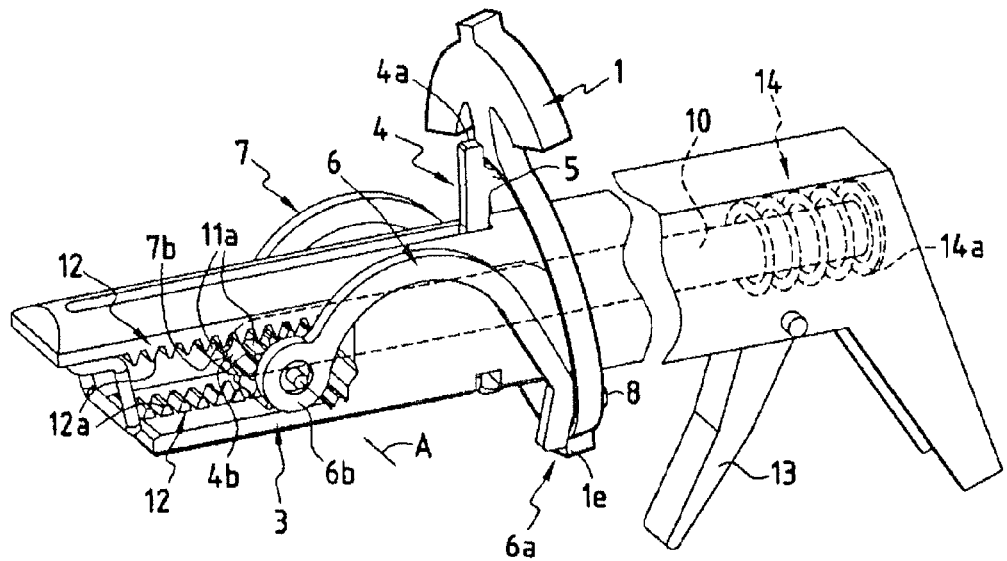

In FIG. 3, the device of the invention is still represented in the rest position, but with an elastic element 1 loaded.

Loading is effected by hooking the upper portion of the closed loop of the elastic element 1 by means of the lug 5 located at the end 4a of the upper arm 4, and by hooking the lower portion of the closed loop of the elastic element 1 by means of the respective lugs 8, 9 (these are hidden) of the ends 6a, 7a (also hidden) of the lower arms 6, 7.

Where appropriate, the device can be equipped with a loading magazine (not shown) in which a prepared bundle of elastic elements, such as that shown in FIG. 1b, is placed so that the upper 4 and lower 6, 7 arms automatically hook onto an elastic element 1 when they are in the initial loading position.

Figure 4:
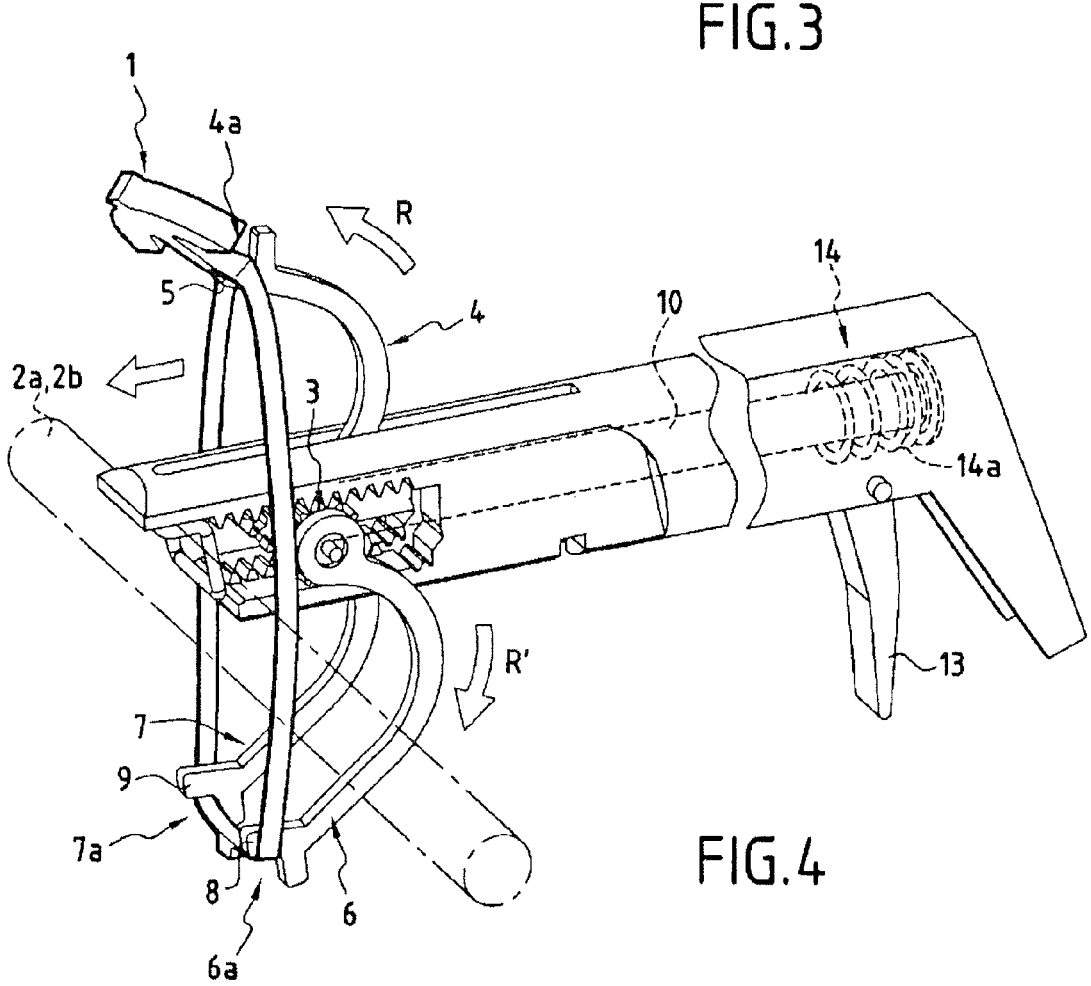

In FIG. 4, the device of the invention is represented in a position in which the elastic element 1 is shown in a stretched state in front of the element 2a, 2b representing a vine shoot 2a and a support wire 2b for example (coincident in FIG. 4 for simplicity).

Passage from the state of the device represented in FIG. 3 to the state of the device represented in FIG. 4 is achieved by the first part of the rotation of the upper arm 4 around axis A in direction R and, simultaneously, by the first part of the rotation of the lower arms 6, 7 around axis A in direction R', opposite to direction R.

It is in this first part of the rotation that firstly the end 4a of the upper arm 4, and secondly the respective ends 6a, 7a of the lower arms 6, 7 move away from each other, until the distance between these ends is maximum, so as to stretch the elastic element sufficiently 1 between its upper portion and its lower portion, which is then presented in front of the element 2a, 2b to be encircled.

If the loading takes place from a prepared bundle of elastic elements, such as that shown in FIG. 1b, whether the latter is or is not placed in a magazine for loading, it is possible that during this first part of the rotation, the elastic element 1 to be fitted is separated from the prepared bundle of elastic elements.

This stage therefore comprises a first stage of the method of the invention for fitting the elastic element 1. FIG. 5 shows the device of the invention in the fitting position of the elastic element 1 around the shoot assembly 2a, 2b.

Passage from the state of the device represented in FIG. 4 to the state of the device represented in FIG. 5 is achieved by the second part of the rotation of the upper arm 4 around axis A in direction R, and, simultaneously, by the second part of the rotation of the lower arms 6, 7 around axis A in direction R', opposite to direction R.

It is indeed in this second part of the rotation that firstly the end 4*a* of the upper arm 4 and secondly the respective ends 6*a*, 7*a* of the lower arms 6, 7 approach each other, until the end 4*a* of the upper arm 4 passes between the respective ends 6*a*, 7*a* of the lower arms 6, 7. Thus, the elastic element 1 encircles the shoot assembly 2*a*, 2*b*, thus constituting a second stage of the method of the invention for fitting the elastic element 1.

Then the head of the elastic element 1 is forced to pass, by deformation, into its closed loop in order to effect the closure of the tie, thus constituting a third stage of the method of the invention for fitting the elastic element 1.

Given the elastic properties of the material used for the elastic element 1, its head will penetrate into in the closed loop. Where appropriate, in order to favour this passage of the head into the closed loop, the distance between the end 4*a* of the upper arm 4 and axis A can be less than the distance between the respective ends 6*a*, 7*a* of the lower arms 6, 7 and this axis A, as already explained above.

Figure 6:
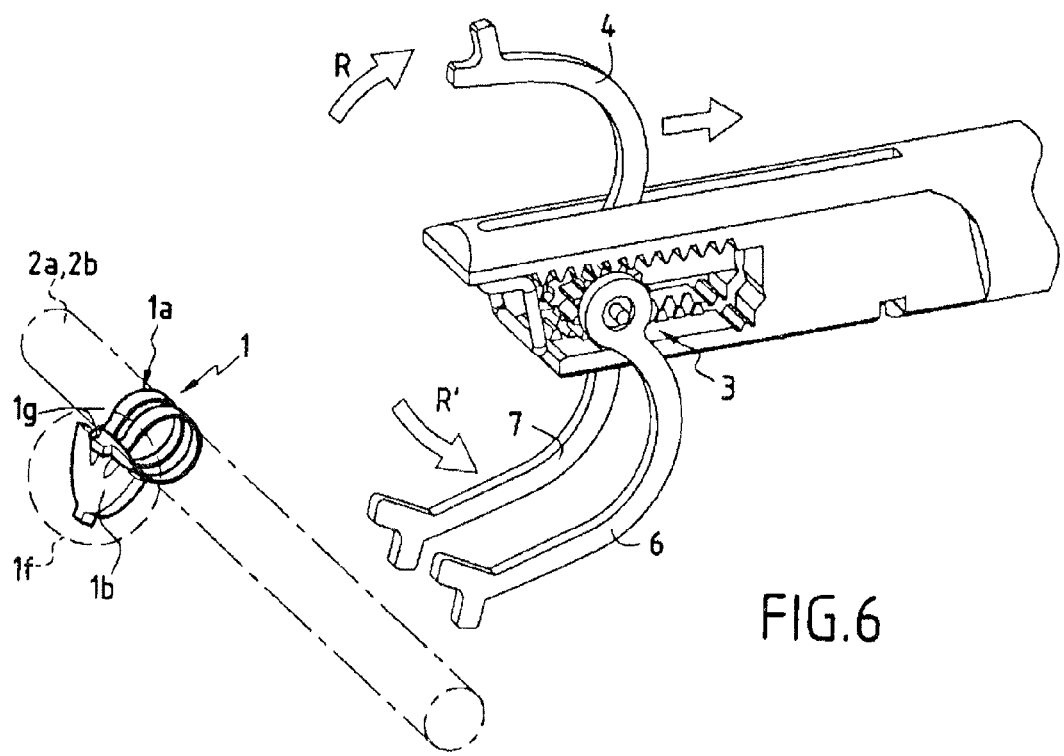

FIG. 6 finally shows the device of the invention after fitting of the elastic element 1 around the shoot assembly 2*a*, 2*b*, and when the upper 4 and lower 6, 7 arms have begun their rotation in the reverse direction in order to respectively unhook the upper portion 1*f* and the lower portion 1*g* of the elastic element 1, and to return to their initial position.

This return to the initial position is achieved by releasing the trigger 13 in the previous figures (not shown in FIG. 6), aided by the spring 14*a* in the previous figures (not shown in FIG. 6), It can be seen that the shape of the head 1*b* of the elastic element 1, which acts as an anchor, therefore enables the tie to be anchored, and so guarantees long-term encircling of the shoot assembly 2*a*, 2*b*, after the upper 4 and lower 6, 7 arms have released the elastic element 1 which therefore closes up. Thus, the device and the method of the invention can be used advantageously to rapidly, simply and automatically fit a large number of elastic securing elements, in particular for the securing of a vine shoot onto a support wire. The device and the method of the invention allow the elastic element 1 to be stretched around the shoot assembly 2*a*, 2*b* without effort, rapidly and easily, and then encircling of the latter up to reliable and durable closure by relaxing the stretch on the elastic element 1.

All of the above description above is provided by way of non-limiting examples of the invention.

In particular the general shape of the elastic element and of the fitting device do not limit the invention.

The invention claimed is:

1. A device for fitting an elastic element, including a closed loop around a rectilinear element, with the device comprising:
   at least one upper arm, equipped with a means for hooking an upper portion of the closed loop of the elastic element at a first end of the at least one upper arm with the upper arm being mounted, by a second end of the at least one upper arm, to pivot around an axis A,
   at least two lower arms, each equipped with a means for hooking a lower portion of the closed loop of the said elastic element at a first end of the at least two lower arms with the lower arms being mounted, each by a second end of the at least two lower arms, to pivot around the axis A,
   rotations means, around the axis A, of the upper arm, in a first direction of the rotation and of the lower arms in a second direction of rotation opposite to the first direction of rotation, from a first loading position to a second fitting position of the elastic element,
   wherein, in a first part of rotation, firstly the first end of the upper arm, and secondly the second ends of the lower arms, move away from each other, and then, in a second part of rotation, the first end of the said upper arm approaches and passes between the second ends of the lower arms.

2. A device according to claim 1, wherein the rotation means include:
   a longitudinal rod that is movable in translation between a first rear loading position of the elastic element and a second front fitting position of the elastic element around the rectilinear element,
   means for the movement in the translation of the longitudinal rod,
   means to convert the translation movement of the longitudinal rod into the rotation of the upper and lower arms around the axis A.

3. A device according to claim 2, wherein the means to convert the translation movement of the longitudinal rod into the rotation of the upper and lower arms around the axis A, include:
   at least one toothed circular element fixed to the front end of the longitudinal rod, which is free to rotate around the axis A, and which creates the link between the upper lower arms and the longitudinal rod,
   at least one rack element having rack element teeth which mate with circular element of the toothed circular element, so that a translation movement of the longitudinal rod generates the rotation of the toothed circular element around the axis A, which in turn generates the rotation, around said axis A, of the upper arm in the first direction of rotation, and of the said lower arms in the second direction of rotation, opposite to the first direction of rotation.

4. A device according to claim 2, wherein the means for the movement in translation of the longitudinal rod include a trigger and/or an actuator.

5. A device according to claim 2, wherein the device includes means for the automatic return of the upper and lower arms to the first loading position of the elastic element.

6. A device according to claim 5, wherein the means for the automatic return of the upper and lower arms to the first loading position of the elastic element, include at least one spring.

7. A device according to claim 6, wherein the spring opposes the translation of the longitudinal rod of the first loading position to the second fitting position of the elastic element.

8. A device according to claim 1, wherein the upper and lower arms are curved.

9. A device according to claim 1 wherein the lower arms are identical and parallel.

10. A device according to claim 1, wherein the distance between the first end of the upper arm and the axis A is less than the distance between the respective first ends of the lower arms and said axis A.

11. A device according to claim 1 wherein at least one of the means for hooking an upper or lower portion of the part in a closed loop of the elastic element is a lug forming a "V" or a "U" with the end of the lower or upper arm on which the means for hooking is located.

12. A device according to claim 1, wherein the device includes a magazine for automatic loading of the elastic element.

13. A method for fitting an elastic element around an element, the method comprising:

fitting an elastic element including a closed loop around a rectilinear element using a device, wherein the device comprises:
  at least one upper arm, equipped with a means for hooking an upper portion of the closed loop of the elastic element at a first end of the at least one upper arm with the upper arm being mounted, by a second end of the at least one upper arm, to pivot around an axis A;
  at least two lower arms, each equipped with a means for hooking a lower portion of the closed loop of the said elastic element at a first end of the at least two lower arms with the lower arms being mounted, each by a second end of the at least two lower arms, to pivot around the axis A;
  rotations means, around the axis A, of the upper arm, in a first direction of the rotation and of the lower arms in a second direction of rotation opposite to the first direction of rotation, from a first loading position to a second fitting position of the elastic element; and
  wherein, in a first part of rotation, firstly the first end of the upper arm, and secondly the second ends of the lower arms, move away from each other, and then, in a second part of rotation, the first end of the said upper arm approaches and passes between the second ends of the lower arms.

14. A method for fitting an elastic element around an element, the method comprising:
  fitting an elastic element including a closed loop around a rectilinear element using a device, wherein the device comprises:
    at least one upper arm, equipped with a means for hooking an upper portion of the closed loop of the elastic element at a first end of the at least one upper arm with the upper arm being mounted, by a second end of the at least one upper arm, to pivot around an axis A;
    at least two lower arms, each equipped with a means for hooking a lower portion of the closed loop of the said elastic element at a first end of the at least two lower arms with the lower arms being mounted, each by a second end of the at least two lower arms, to pivot around the axis A;
    rotations means, around the axis A, of the upper arm, in a first direction of the rotation and of the lower arms in a second direction of rotation opposite to the first direction of rotation, from a first loading position to a second fitting position of the elastic element;
    wherein, in a first part of rotation, firstly the first end of the upper arm, and secondly the second ends of the lower arms, move away from each other, and then, in a second part of rotation, the first end of the said upper arm approaches and passes between the second ends of the lower arms;
  a stage for stretching the elastic element between an upper portion and a lower portion of said closed loop;
  a stage for encircling the rectilinear element with the elastic element; and
  a stage for closure of the encircling tie around the rectilinear element by means of the elastic element, by inserting the upper portion of the closed loop of the elastic element into said closed loop at the level of said lower portion.

\* \* \* \* \*